US011259381B2

(12) United States Patent
Tao et al.

(10) Patent No.: US 11,259,381 B2
(45) Date of Patent: Feb. 22, 2022

(54) LED DRIVER AND LED LIGHTING SYSTEM FOR USE WITH A HIGH FREQUENCY ELECTRONIC BALLAST

(71) Applicant: SIGNIFY HOLDING B.V., Eindhoven (NL)

(72) Inventors: Haimin Tao, Eindhoven (NL); Brian Zhang, Shanghai (CN); Derek Zheng, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/269,024

(22) PCT Filed: Aug. 13, 2019

(86) PCT No.: PCT/EP2019/071679
§ 371 (c)(1),
(2) Date: Feb. 17, 2021

(87) PCT Pub. No.: WO2020/035479
PCT Pub. Date: Feb. 20, 2020

(65) Prior Publication Data
US 2021/0329761 A1  Oct. 21, 2021

(30) Foreign Application Priority Data

Aug. 17, 2018  (WO) ................. PCT/CN2018/101165
Nov. 5, 2018  (EP) ....................... 8204404

(51) Int. Cl.
| H05B 45/35 | (2020.01) |
| H05B 45/3578 | (2020.01) |
| H05B 45/3725 | (2020.01) |
| H05B 45/10 | (2020.01) |

(52) U.S. Cl.
CPC ............ *H05B 45/35* (2020.01); *H05B 45/10* (2020.01); *H05B 45/3578* (2020.01); *H05B 45/3725* (2020.01)

(58) Field of Classification Search
CPC ... F21K 9/27; F21K 9/278; F21K 9/66; F21K 9/90; F21V 23/06; F21V 25/04;
(Continued)

(56) References Cited

U.S. PATENT DOCUMENTS

| 2012/0104975 A1 | 5/2012 | Vigh et al. |
| 2013/0221867 A1 | 8/2013 | Deppe et al. |
| 2013/0320869 A1* | 12/2013 | Jans ............... H05B 45/3578 315/186 |

(Continued)

FOREIGN PATENT DOCUMENTS

| EP | 3110027 A1 * 12/2016 ............... H04B 3/46 |
| JP | 2013-543642 A  12/2013 |

(Continued)

*Primary Examiner* — Renan Luque
(74) *Attorney, Agent, or Firm* — Daniel J. Piotrowski (57) ABSTRACT

The invention provides a retrofit LED lamp driver having a shunt switch to alternately shunt (for a first duration) and not shunt (for a second duration) received AC power. The first duration is concurring with a first polarity of each AC cycle of the AC power, for a first period comprising at least one AC cycle, and the first duration is concurring in a second, opposite polarity of the AC power, for a second period comprising another at least one AC cycle not overlapping with the first duration. Alternating the first and second periods are provided. Any DC offset in the current drawn caused by the shunting operation is thereby cancelled over time.

15 Claims, 4 Drawing Sheets

(58) Field of Classification Search
CPC .. F21V 29/70; F21Y 2107/30; F21Y 2115/10; H01R 33/7692; H02M 1/0058; H02M 1/32; H02M 5/458; H05B 45/00; H05B 45/10; H05B 45/20; H05B 45/355; H05B 45/3578; H05B 45/36; H05B 45/37; H05B 45/3725; H05B 45/375; H05B 45/38; H05B 45/382; H05B 45/385; H05B 45/39; H05B 45/395; H05B 45/42; H05B 45/46; H05B 45/50; H05B 45/60; H05B 47/10; H05B 47/115; H05B 47/165; H05B 47/20; H05B 47/24; Y02B 20/30; Y02B 20/40; Y02B 70/10
See application file for complete search history.

(56) References Cited

U.S. PATENT DOCUMENTS

| | | | |
|---|---|---|---|
| 2015/0181667 A1 | 6/2015 | Tao et al. | |
| 2016/0113091 A1* | 4/2016 | Tao | H05B 45/50 315/127 |
| 2017/0184294 A1 | 6/2017 | Tao | |
| 2017/0290116 A1* | 10/2017 | Bruwer | H05B 45/10 |

FOREIGN PATENT DOCUMENTS

| | | | | |
|---|---|---|---|---|
| JP | 2014-509053 A | 4/2014 | | |
| JP | 2015-530062 A | 10/2015 | | |
| JP | 2017-520097 A | 7/2017 | | |
| WO | WO-2014109584 A1 * | 7/2014 | ........... | H05B 47/185 |
| WO | 2017/167643 A1 | 10/2017 | | |
| WO | 2018054841 A1 | 3/2018 | | |

* cited by examiner

LED DRIVER AND LED LIGHTING SYSTEM FOR USE WITH A HIGH FREQUENCY ELECTRONIC BALLAST

CROSS-REFERENCE TO PRIOR APPLICATIONS

This application is the U.S. National Phase application under 35 U.S.C. § 371 of International Application No. PCT/EP2019/071679, filed on Aug. 13, 2019, which claims the benefit of International Patent Application No. PCT/CN2018/101165, filed on Aug. 17, 2018 and European Patent Application No. 18204404.0, filed on Nov. 5, 2018. These applications are hereby incorporated by reference herein.

FIELD OF THE INVENTION

The present invention generally relates to the field of lighting and, more specifically, to a retrofit Light Emitting Diode, LED, lamp. The present invention further relates to a lighting system comprising a high frequency electronic ballast and the retrofit LED lamp, and to a method of operating a retrofit LED lamp.

BACKGROUND OF THE INVENTION

Lighting devices have been developed that make use of Light Emitting Diodes, LEDs, for a variety of lighting applications. Owing to their long lifetime and high energy efficiency, LED lamps are nowadays also designed for replacing traditional fluorescent lamps, i.e. for retrofit applications. For such an application, a retrofit LED tube is typically adapted to fit into the socket of the respective lamp fixture to be retrofitted. Moreover, since the maintenance of a lamp is typically conducted by a user, the retrofit LED tube should ideally be readily operational with any type of suitable fixture without the need for re-wiring the fixture.

One of the drawbacks of the retrofit LED tube is that it does not function properly in case the LED tube also allows for dimming. One approach for implementing dimming is to use a so-called shunt switch. The shunt switch is used to bypass the LEDs when the switch is closed, in particular to reduce the LED voltage below the minimum LED string voltage.

Figure 1:
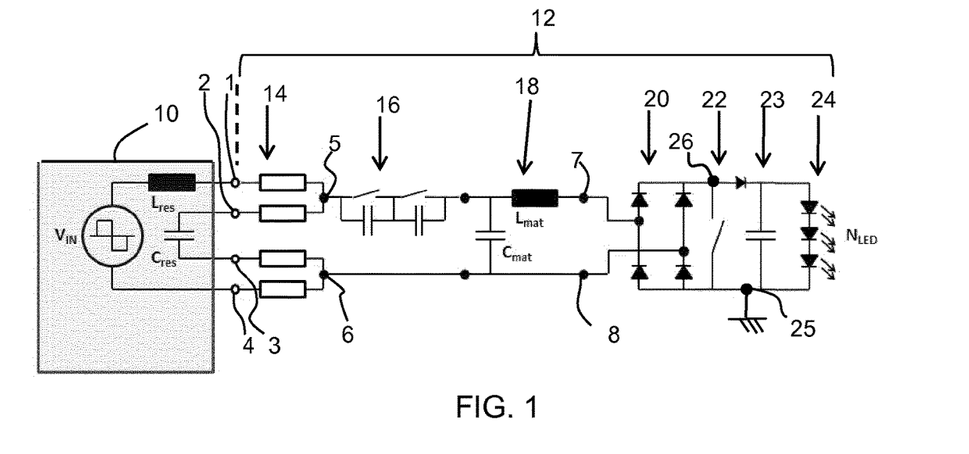
FIG. 1 shows a typical block diagram of a TLED that is compatible with a fluorescent ballast.

FIG. 1 shows a typical block diagram of a TLED that is compatible with a fluorescent ballast.

The high frequency, HF, ballast 10 comprises a half-bridge parallel resonant converter and it drives an electronic (high frequency) ballast compatible TLED 12.

The ballast 10 and high frequency compatible TLED 12 are connected via the connection pins 1 and 2 at one end of the TLED and via the connection pins 3 and 4 at the other end of the TLED.

A high frequency compatible TLED 12 typically comprises all of the building blocks depicted in FIG. 1. These are a filament emulation unit 14, a pin safety and start-up circuit 16, a matching circuit 18, a rectifier 20, an LED driver 22, a smoothing capacitor 23 and the LED string 24. The LED string 24 extends between an internal ground 25 and a high voltage DC bus 26.

For most of these building blocks, the implementations shown in FIG. 1 are just examples and other implementations of their functions are possible and are also used.

The details of the design of the half-bridge ballast 10 are not shown in FIG. 1. This type of ballast is also just an example and other implementations such as push-pull converters are also possible and in use.

The LED driver shown in FIG. 1 is a shunt switch driver. In this type of driver, a shunt switch 22 performs a shorting function in order to implement dimming control.

In the shunt driver design, the shunt switch is controlled by a controller integrated circuit in order to provide a duty cycle which provides a desired light output. In a widely used implementation, the shunt switch is controlled per period of the time-varying input signal. This shunt control signal needs to be timed with the frequency of the time-varying input signal e.g. the high frequency signal from the electronic ballast and for this purpose a detection signal is used for timing control. This detection signal for example is based on detection of the current flowing from the ballast. A convenient detection signal is the zero crossing of the time-varying input signal which is an AC signal.

The use of a shunt switch for implementing dimming of a retrofit LED lamp is for example disclosed in WO 2018/054841 which discloses that the shunting can happen in both the positive part and the negative part of the AC supply voltage. The shunt switch is used to turn the LED lamp on and off. US 2013/00221867 discloses an LED lamp which incorporates a shunt switch, used for controlling the power or current of the lamp so that it is compatible with a lamp fixture, for example a lamp fixture with power factor correction requiring an average current to be in a particular range. Thus, the shunt switch is used to make the lamp suitable for retrofit applications.

A problem can arise that a protection function of an HF ballast may be undesirably triggered by a connected retrofit lamp, such as an end of life protection based on detection of a DC offset in the delivered HF ballast output. Thus, there is an issue that some operating modes of the retrofit lamp mean that a DC bias is present in the current drawn from the ballast, and this can result in a protection function being triggered.

SUMMARY OF THE INVENTION

The invention is defined by the claims.

It is a concept of the invention to provide a shunt-based retrofit LED lamp driver in which the timing of the shunt operation may be synchronized either with a first (e.g. positive) polarity of the received AC power or with a second (e.g. negative) polarity of the received AC power. In this way, a first period may be provided with the first synchronization and a second period may be provided with the second synchronization. By providing alternating first and second periods, a DC offset which is present in the HF driver output is cancelled.

According to examples in accordance with an aspect of the invention, there is provided a retrofit LED lamp driver to be used with a supply of AC power with AC cycles with a first frequency, wherein each AC cycle comprises opposite first polarity and second polarity, comprising:

a shunt switch adapted to alternately shunt the AC power from the supply and thereby prevent the AC power from reaching the lamp in a first duration, and not shunt the AC power and thereby allow it to pass to the lamp in a second duration;

characterized in that further comprising:
a controller, adapted to:
concur the first duration with a first polarity of each AC cycle of the AC power, for a first period comprising a first at least one AC cycle of the AC power;

concur the first duration in a second, opposite polarity of each AC cycle of the AC power, for a second period comprising a second at least one AC cycle of the AC power not overlapping with the first at least one AC cycle of the AC power; and provide alternating first and second periods.

This driver alternates how the shunt switching takes place. During one period/time duration of at least one AC cycle, the shunting takes place mainly for the first polarity of the HF driver output (e.g. when the HF driver output is positive) and during a next period/time duration of at least one AC cycle not overlapping with the previous period, the shunting takes place for the second polarity of the HF driver output (e.g. when the HF driver output is negative). In this way, a DC offset which is present in the HF driver output is alternated between the first and second periods so that the DC offset as a whole is cancelled over a longer time period.

The controller may be adapted to provide alternating first and second periods thereby generating a second periodic signal with a second frequency lower than the first frequency and with a DC component less than a threshold.

Although the second frequency is lower than the HF ballast frequency (which may be 50 kHz) it is still high enough that the protection mode of the AC power supply is not triggered.

The first frequency is for example in the range 10 to 100 kHz, and the second frequency is for example in the range 200 Hz to 1 kHz, and the DC component is zero.

The supply of AC power for example comprises a fluorescent lamp electronic ballast, wherein the length of the first period and/or the second period is adapted to be shorter than a protection reaction period in the electronic ballast, wherein said protection reaction period relates to detection of the DC component in the output of the electronic ballast.

As mentioned above, this means that the protection mode is not initiated, even when there is a DC offset in the current delivered by the ballast which would, without the modification of the invention trigger the protection mode. The invention means that any such DC offset lasts only for a short period before the protection reaction starts.

The first duration and the second duration then preferably take up one cycle of the AC power, and the controller is adapted to start the first duration at the start of a corresponding polarity of the AC power.

Thus, each cycle of the AC power is divided into a shunt portion and a non-shunt portion. This makes the shunt switching operate at a relatively low frequency, in particular at a same frequency as the AC power, for so that EMI issues are reduced.

The first period may comprise a plurality of successive AC cycles of the AC power, and the second period may then comprise another plurality of successive AC cycles of the AC power succeeding the first period. The switching rate between the two periods can thus be reduced. The first period for example has substantially the same time length as the second period.

The controller may be adapted to:

determine if a ratio of the first duration to the second duration is in a range between a minimum threshold and a maximum threshold;

if the ratio is in the range, to provide said concurring with opposite polarities;

otherwise if the ratio is outside the range, to synchronize the first duration with a first polarity or the second polarity of the AC power, for the first and second periods.

The switching between polarities can thus be avoided if the first and second durations fall outside a certain range. For example, if there is a 50:50 duty cycle between the first and second durations, there may be a large DC offset if the first duration is fixed to either the first polarity or the second polarity. Therefore the alternation of the first duration in opposite polarities is needed. If the ratio is much larger or smaller, the DC component may be less. For example with a 10:90 or 90:10 ratio, the positive current and the negative current are almost the same even if the first duration is fixed to the first polarity or the second polarity. In this case, the alternation of the first duration in opposite polarities can be saved/not used, and the first duration can be fixed to the first polarity or the second polarity.

The lamp driver may further comprise:

a rectifier having a rectifier input for receiving the driver input and having a rectifier output for driving the lighting load, wherein the shunt device is either:

connected between the rectifier and the lighting load, for selectively shunting the rectifier output; or integrated with the rectifier and for shunting the driver input.

This embodiment provides two specific implementations of the shunt device.

A dimming interface may be provided for receiving a dimming level, and said controller is adapted to implement closed loop control according to said dimming level, and said ratio is dependent on the dimming level.

The dimming level directly relates to the ratio of shunt and non-shunt time periods. For example, the higher the dimming level (output level), the smaller the ratio of shunt to non-shunt time periods, and vice versa. The lamp driver can selectively activate the alternation according to the dimming level.

The invention also provides a lighting device comprising:

a lamp driver as defined above; and an LED lighting load, such as a tubular LED lamp, to be driven by said lamp driver.

The invention also provides a method of controlling a lighting load, comprising:

receiving an supply of AC power with AC cycles with a first frequency, wherein each AC cycle comprises opposite first polarity and second polarity;

controlling a shunt device for selectively shunting the AC power from the supply and thereby prevent the AC power from reaching the lamp in a first duration, and not shunting the AC power and thereby allow it to pass to the lamp in a second duration; and characterized in that further comprising:

concurring the first duration with a first polarity of each AC cycle of the AC power, for a first period comprising at least one AC cycle of the AC power;

concurring the first duration in a second, opposite polarity of each AC cycle of the AC power, for a second period comprising at least one AC cycle of the AC power not overlapping with the first at least one AC cycle of the AC power; and providing alternating first and second periods.

This is how the lighting driver defined above operates.

The first duration and said second duration for example take up one cycle of the AC power and wherein the method comprises providing alternating first and second periods thereby generating a second periodic signal with a second frequency lower than the first frequency and with a DC component less than a threshold.

The first period for example comprises a plurality of successive AC cycles of the AC power, and the second period comprises another plurality of successive AC cycles of the AC power, and wherein the first period has substantially the same time length as the second period, and the DC component is zero.

The method may also comprise determining if a ratio of the first duration to the second duration is in a range between a minimum threshold and a maximum threshold;

if the ratio is in the range, to synchronize the first duration with a first polarity of the AC power, for the first and second periods; and otherwise if the ratio is outside the range, to synchronize the first duration with a first polarity of the AC power, for the first and second periods.

The supply of AC power is for example received from a fluorescent lamp electronic ballast, wherein the length of the first period and/or the second period is adapted to be shorter than a protection reaction period in the electronic ballast, wherein said protection reaction period relates to detection of DC signal in the output of the electronic ballast.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a retrofit LED lamp driver having a shunt switch to alternately shunt (for a first duration) and not shunt (for a second duration) received AC power. The first duration is synchronized with a first polarity of the AC power, for a first period and the first duration is synchronized in a second, opposite polarity of the AC power, for a second period. Alternating first and second periods are provided. Any DC offset in the current drawn caused by the shunting operation is thereby cancelled over time.

Figure 2:
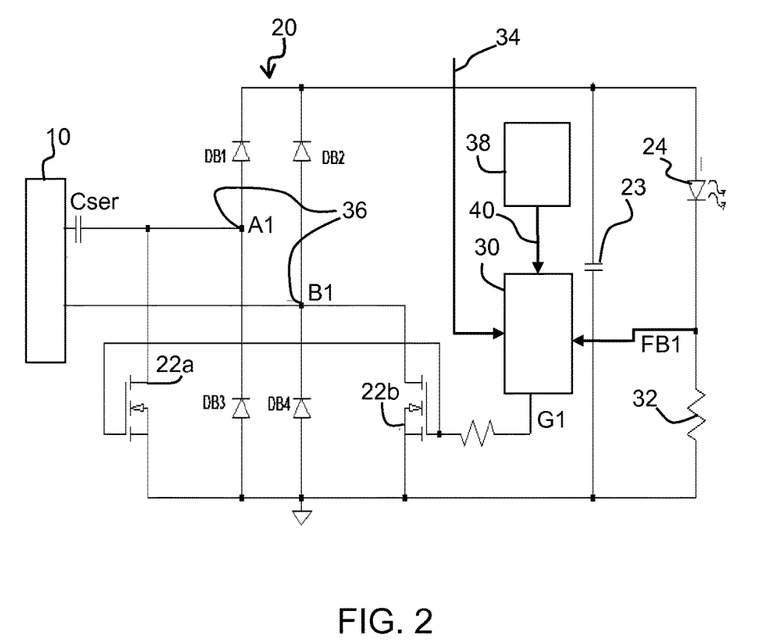
FIG. 2 shows an example of the known shunt driver configuration in more detail.

FIG. 2 shows an example of the known shunt driver configuration in more detail. For simplicity, only the ballast 10, rectifier 20 (formed of diode bridge diodes DB1 to DB4), output capacitor 23, LED lighting load 24 and shunt device 22a and 22b, which are essentially similar to the shunt device 22 of FIG. 1, are shown.

For a European HF ballast, normally the output current is symmetrical and has a high frequency. If the output current of the ballast is not symmetrical, and this status is sustained for more than 1 second, this will trigger a DC bias protection function inside the ballast (the end of life protection function). The ballast will then shut down its output and this leads to compatibility issues meaning the TLED lamp will not work with the ballast.

When a HF ballast according to a North American design connects with a TLED lamp, a serial safety capacitor Cser is used as shown in FIG. 2. The capacitor blocks the DC component and thus prevents the DC bias protection function being triggered. However, HF ballasts based on European designs have a different working principle meaning the series capacitor cannot be used; the presence of the capacitor will shut down the output current.

The shunt device is implemented as two transistors 22a, 22b which together short together the rectifier input in this example, instead of the rectifier output as shown in FIG. 1. Even further, the two transistor 22a and 22b can replace some diodes when the two transistors can also be controlled as a rectifying element. Such implementation is known as a bridgeless implementation. Thus, the shunt device is either connected between the rectifier and the lighting load (FIG. 1) for selectively shunting the rectifier output, or integrated with the rectifier and for shunting the driver input (FIG. 2).

The transistors 22a, 22b are controlled by a shunt control signal G1 which is provided by a controller integrated circuit 30. The shunt control signal G1 is a bi-state shunt control signal. The controller 30 receives a feedback signal FB1 from a current sense resistor 32, and also receives a dimming command 34 which is for example received wirelessly from a remote controller. It then operates the shunt device transistors 22a, 22b to prevent current reaching the LED load or else does not operate the shunt device transistors to allow the LED load to be driven, such that an energy goes to the LED load which is regulated to provide a dimming effect corresponding to the dimming command 34.

Thus, to achieve a closed loop control, resistor 32 implements a feedback loop to detect the current flowing to the lighting load and then control the length of the duration of operating the shunt device according to said dimming level and said detected current.

The lighting driver comprises a driver input 36 for receiving an alternating current power supply from the ballast 10. The controller 30 operates the shunt device during a portion of the cycle of the alternating current power supply, such that a current is delivered to the LED load only during the portion of the cycle of the alternating current power supply when the shunt device is not operated.

The driver also has a detector 38 for generating a detection signal 40 and for providing the detection signal to the controller 30 to operate the shunt device. This detection signal 40 is timed with the frequency of the AC input signal and is used to implement cycle by cycle control so that the shunt device frequency tracks the ballast frequency. More specifically, the shunt switch is operated in accordance with zero crossing of the AC input (current) signal to implement soft switching.

The controller 30 also has a dimming interface for receiving the dimming level 34. The controller 30 controls a length of a duration of operating the shunt device according to said dimming level.

Figure 3:
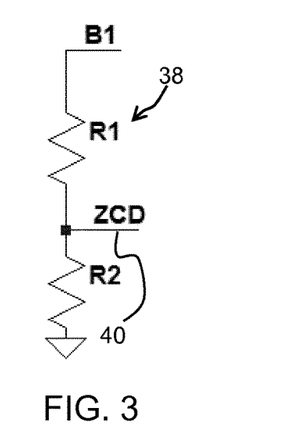
FIG. 3 shows a known example of the detection circuit to generate a detection signal.

FIG. 3 shows a known example of the detection circuit 38 to generate the detection signal 40 in the form of a zero crossing detection signal ("ZCD"). The circuit comprises a resistive divider R1, R2 between one of the rectifier inputs (B1) and ground. When the load is connected to the ballast, the voltage at this point is a square wave signal, and the resistive divider generates a lower voltage version. Switching based on zero crossing detection is only one possible way to implement the synchronization with the AC input signal.

Figure 4:
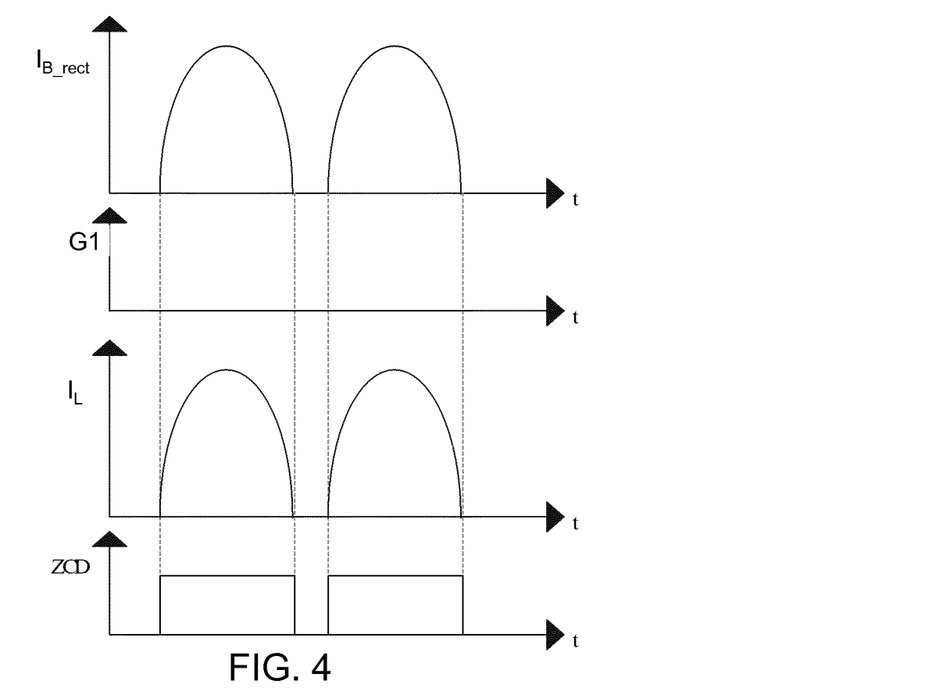
FIG. 4 shows timing diagrams to explain the operation of the circuit of FIGS. 2 and 3 at full brightness.

FIG. 4 shows timing diagrams to explain the operation of the circuit of FIGS. 2 and 3 at full brightness.

The top plot shows the current $I_{B\_rect}$ delivered by the ballast after rectification within the TLED 12, and comprises positive sine wave pulses with a short zero duration between. The second plot shows the shunt control signal G1, the third plot shows the current $I_L$ supplied to the LED load and the bottom plot shows the detection signal ZCD.

In FIG. 4, there is no shunt control signal because there is no shunting needed. The current is supplied to the load at all times. The ZCD signal is in polarity with the un-shunted input current. It has a leading edge from zero to a high value, and a trailing edge from the high value to zero. The trailing edge is at the same time as the zero crossing thus the driver knows the timing of an end of this half cycle and a start of a next half cycle.

Figure 5:
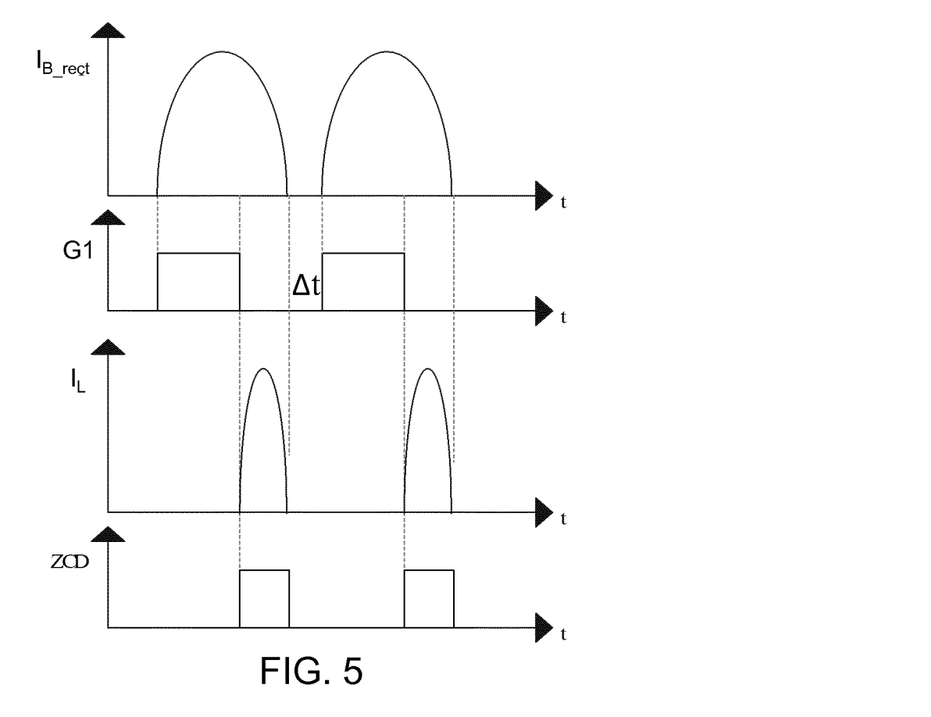
FIG. 5 shows timing diagrams to explain the operation of the circuit of FIGS. 2 and 3 at a dimmed brightness level.

FIG. 5 shows timing diagrams to explain the operation of the circuit of FIGS. 2 and 3 at a dimmed brightness level. In FIG. 5, shunt switching happens as G1 has a duration of a high pulse at each start of a half cycle, which start is indicated by a previous trailing edge of the ZCD signal. After that duration, the signal G1 returns to low level and the ballast current $I_B$ is then able to flow to the LED load.

More specifically, again, the top plot shows the current $I_B$ delivered by the ballast, the second plot shows the shunt control signal G1, the third plot shows the current $I_L$ supplied to the LED load and the bottom plot shows the detection signal ZCD.

The shunt control signal causes part of the current waveform not to pass to the load. The detection signal is hence shorter, since it only arises when there is a load current and hence voltage. Triggered by the trailing edge of the detection signal ZCD, the driver knows an end of this half cycle and a start of a next half cycle, and the shunt device will be operated again almost immediately, though the drawing shows a small time offset Δt between them.

The ballast current passes through the shunt device during shunt switching.

In the above embodiment, the shunt and non-shunt periods are provided in each half cycle of the ballast output current. Thus from the AC view, both the positive half cycle and the negative half cycle have shunt and non shunt durations, thus the average positive current and average negative current are similar. This similarity causes the DC component of the ballast output current to be small, even zero. Thus, the ballast will not enter protection mode.

However, a problem of alternation in each half cycle is that it requires a higher switching frequency and may introduce EMI problems.

It would be desirable to provide control of the shunt switching with only one cycle per full AC cycle of the input power. A normal solution is to synchronize the shunt duration at a fixed, either positive or negative, polarity of the AC power.

Figure 6:
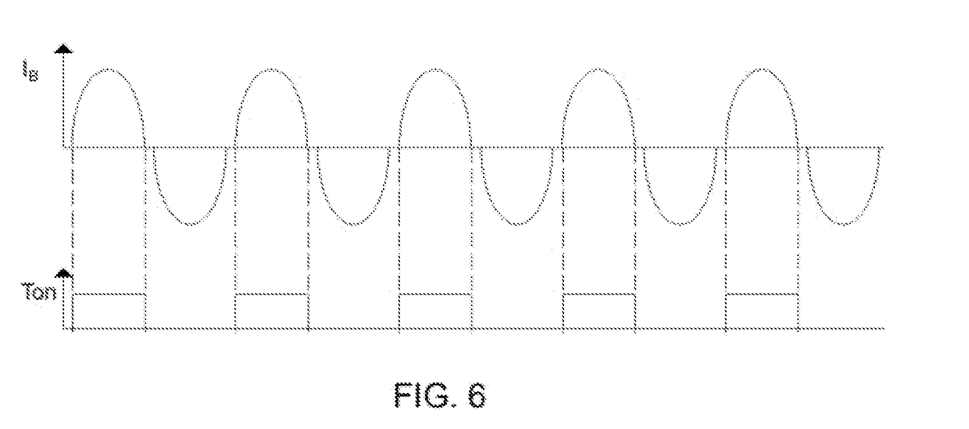
FIG. 6 shows the ballast output current $I_B$ with a 50:50 duty cycle of the shunt switch.

FIG. 6 shows the ballast output current $I_B$ with shunt switching once per full AC cycle instead of once per half cycle as in FIG. 5. It also shows a 50% duty cycle signal Ton during which shunting is to take place and it does not take account of different load conditions during shunting and during non-shunting. The shunt control signal has the same frequency as the AC input power. The shunt timing is synchronized with the positive half cycle. With a 50% duty cycle, this means the positive half cycle of the ballast output current $I_B$ is shunted whereas the negative half cycle is not shunted.

Figure 7:
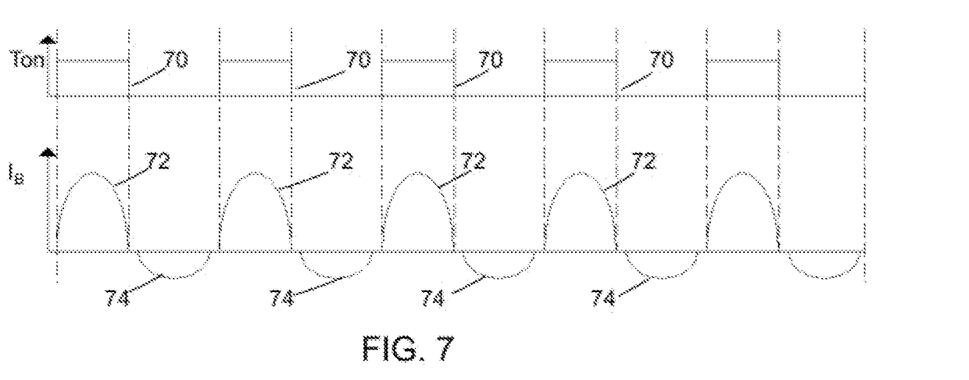
FIG. 7 shows the effect of the shunt control of FIG. 6 in the presence of a load.

The effect of this shunt control scheme in the presence of a load (which is different during shunting and non-shunting) is explained with reference to FIG. 7. FIG. 7 shows the same shunt control signal Ton, and then shows the effect of a lighting load on the actual current $I_B$ delivered by the ballast.

During the periods 70 of load shunting, the load seen by the ballast is very small, namely the impedance of the shunt switches 22a, 22b. As a result, a high current 72 flows. During the periods when the load is not shunted, the load seen by the ballast is much larger, namely the LED load. As a result, a smaller current 74 flows. Note that although ballast is deemed as a current source, its output current can still vary due to different loading.

The result is that there is a DC bias in the current delivered by the ballast. In this example, there is a positive DC bias to the current drawn from the ballast (as shown during time period t1 of FIG. 8). This DC bias lasts for a long time and it may trigger the electronic ballast's protection.

Thus, when there is a 50:50 duty cycle between the shunting and non-shunting durations, there may be a large DC offset. In particular, when all of the positive current is shunted, the positive current drawn is much larger than the negative current. Note that other ratios may also cause this problem, like between 20:80 and 80:20.

The opposite case will arise if the negative current is shunted (the shunt is synchronized with the negative polarity only), i.e. the negative current drawn will be much larger than the positive current.

The invention thus makes use of a switching scheme which alternates between shunting primarily/initially of the positive current and shunting primarily/initially of the negative current. For the 50:50 duty cycle, there is always shunting of one half cycle, and the DC bias effect is most pronounced. However, even for other duty cycles, a DC bias will arise.

For example, with a 25% duty cycle, half of the positive half cycle will be shunted and the full negative half cycle will be non-shunted. Corresponding non-shunted portions of the positive and negative half cycles will result in the same or similar current draw. However, the shunted portion of the positive half cycle will result in a higher current than the remaining non-shunted portion of the negative half cycle. Thus, a positive DC bias will again arise.

Figure 8:
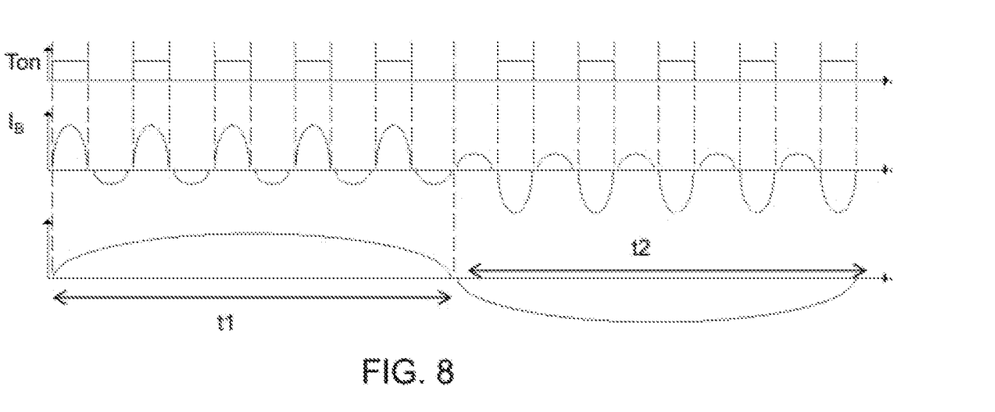
FIG. 8 shows a timing diagram in accordance with an approach according to one example of the invention.

FIG. 8 shows a timing diagram in accordance with an approach according to one example of the invention. The invention may be implemented by the system shown in FIG. 2, and simply involves an alternative control routine implemented by the controller integrated circuit 30.

Thus, as explained above, there is a shunt switch 22a, 22b adapted to alternately shunt the AC power from the supply and thereby prevent the AC power from reaching the lamp in a first duration, and not shunt the AC power and thereby allow it to pass to the lamp in a second duration.

The controller 30 repeatedly synchronizes the first duration with a first polarity of the AC power, for a first period t1. In the example shown, the first polarity is the positive half cycle of the received input power. The first duration is the shunt time period, i.e. the time period when Ton is high. FIG. 8 shows the first period t1 comprising 5 full cycles of the AC power, but more generally it comprises at least one full cycle.

The first duration Ton is synchronized in a second, opposite polarity of the AC power, for a second period t2 following the first period t1. Thus, in FIG. 8, the second opposite polarity is the negative half cycle of the received input power. The second period t2 also comprises 5 full cycles of the AC power, but more generally it comprises at least one full cycle.

The first period t1 preferably has substantially the same time length as the second period t2, and they may thus comprise an identical number of cycles of the received AC power. However, this is not essential and they may have slightly different durations. For example, different durations may be used to compensate for slightly different DC bias levels which arise when the positive and negative half cycles are shunted (due to differences in circuit operation when operating with different input signal polarity).

The first and second periods are alternated, so that they create a new signal with a frequency lower than the frequency of the received AC power. This new signal is formed from the envelope of the ballast working frequency signal.

The effect of the control scheme of FIG. 8 is that the driver alternates how the shunt switching takes place. During the first period t1, the shunting takes place for the first part of the HF driver output (when the HF driver output is positive). During the second period t2, the shunting takes place for the second part of the HF driver output (when the HF driver output is negative). The shunt switching starts at the start of a corresponding polarity of the AC power. This may be achieved by using zero crossing detection or by other timing approaches.

FIG. 8 shows the situation for a 50:50 duty cycle. During the period t1 there is a positive DC offset, exactly as shown in FIG. 7. However, during the period t2 there is a negative offset. The DC offset thus alternates in sign between the first and second periods t1, t2 so that the DC offset is cancelled over a longer time period corresponding to multiple periods of the alternating signal t1, t2, which is a second periodic signal. Note that the waveform showing the DC offset is only for illustration, and it may be a square wave, triangular wave or any other shape.

This second periodic signal has a second frequency lower than the frequency of the received AC power, and a DC component is made to be less than a threshold.

Although the second frequency is lower than the HF ballast frequency (which may be 50 kHz) it is still high enough that the protection mode of the AC power supply is not triggered. In other words, the duration of the DC offset in one single polarity polarity is short with respect to the protection response time of the electronic ballast. The first frequency of the received AC power from the HF ballast is for example in the range 10 to 100 kHz, whereas the second frequency is for example in the range 200 Hz to 1 kHz, for example 200 Hz to 500 Hz.

This second frequency is selected having regard to the fluorescent lamp electronic ballast to which the lamp driver is to be connected. The length of the first period and/or the second period is chosen to be shorter (i.e. faster) than a protection reaction period in the electronic ballast, which may be as long as 1 second. For such a reaction period, a frequency of 60 Hz or more is adequate. This protection reaction period relates to detection of the DC component in the output of the electronic ballast.

As explained above, the DC offset is largest when one half cycle is shunted and the other is not. A ratio of the first duration to the second duration may be determined and if it is in a range between a minimum threshold and a maximum threshold the synchronization with opposite polarities is used. For example, the range may be a duty cycle in the range of 40:60 to 60:40 or 30:70 to 70:30.

If the ratio is outside the range, the first duration may simply be synchronized all the time with a first polarity of the AC power. The polarity switching between time periods can thus be avoided, for example to save power, if the first and second durations fall outside a certain range.

Figure 9:
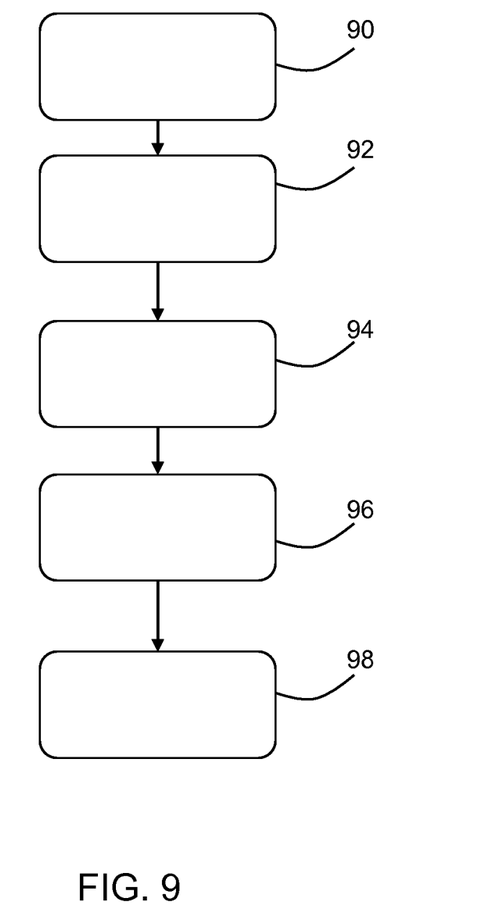
FIG. 9 shows a method of controlling a lighting load.

FIG. 9 shows a method of controlling a lighting load, comprising:

in step 90, receiving an supply of AC power with a first frequency;

in step 92, controlling a shunt device for selectively shunting the AC power from the supply and thereby prevent the AC power from reaching the lamp in a first duration, and not shunt the AC power and thereby allow it to pass to the lamp in a second duration;

in step 94, synchronizing the first duration with a first polarity of the AC power, for a first period comprising at least one cycle of the AC power;

in step 96, synchronizing the first duration in a second, opposite polarity of the AC power, for a second period comprising at least one cycle of the AC power; and in step 98, providing alternating first and second periods.

Only one timing example has been shown above. However, it will be immediately apparent that the first duration may instead be the negative half cycle and the second duration may be the positive half cycle (since it is simply a matter of definition of terms). There may be any number of AC cycles in each period t1, t2. The greater the number, the lower the rate at which switching needs to take place between the opposite polarities, but the longer a DC bias will be present. The shunt switching is controlled with the same frequency as the received AC signal, i.e. at the same frequency as the HF ballast frequency. Thus, the use of a higher frequency switching signal is avoided, as is for example required for the approach shown in FIG. 5.

By selecting the shunt switch working frequency to be the same as the ballast working frequency, the ballast EMI filter design is matched. This reduces the impact on RF circuits and other circuits. The ballast frequency is tracked for this purpose by the system and this enables precise ZCD control and accurate dimming control.

The approach is able to be used with European ballasts, without any DC blocking series capacitor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together

The invention claimed is:

1. A retrofit LED lamp driver to be used with a supply of AC power with AC cycles with a first frequency, wherein each AC cycle comprises opposite first polarity and second polarity, comprising:
   a shunt switch adapted to alternately shunt the AC power from the supply and thereby prevent the AC power from reaching the lamp in a first duration, and not shunt the AC power and thereby allow it to pass to the lamp in a second duration following the first duration;
   a controller, adapted to:
      concur the first duration with the first polarity of each AC cycle of the AC power, for a first period comprising a first at least one AC cycle of the AC power;
      concur the first duration with the second, opposite polarity of each AC cycle of the AC power, for a second period comprising a second at least one AC cycle of the AC power not overlapping with the first at least one AC cycle of the AC power; and
      provide alternating first and second periods.

2. The lamp driver according to claim 1, wherein the controller is adapted to provide alternating first and second periods thereby generating a second periodic signal with a second frequency lower than the first frequency and with a DC component less than a threshold.

3. The lamp driver as claimed in claim 2, wherein the first frequency is in the range 10 to 100 kHz, and the second frequency is in the range 200 Hz to 1 kHz, and the DC component is zero.

4. The lamp driver as claimed in claim 2, wherein the supply of AC power comprises a fluorescent lamp electronic ballast, wherein the length of the first period and/or the second period is adapted to be shorter than a protection reaction period in the electronic ballast, wherein said protection reaction period relates to detection of the DC component in the output of the electronic ballast.

5. The lamp driver as claimed in claim 1, wherein said first duration and said second duration take up one cycle of the AC power, and the controller is adapted to start the first duration at the start of a corresponding polarity of the AC power.

6. The lamp driver as claimed in claim 1, wherein the first period comprises a plurality of successive AC cycles of the AC power, and the second period comprises another plurality of successive AC cycles of the AC power succeeding the first period, and
   wherein the first period has substantially the same time length as the second period.

7. The lamp driver as claimed in claim 1, wherein the controller is adapted to:
   determine if a ratio of the first duration to the second duration is in a range between a minimum threshold and a maximum threshold;
   if the ratio is in the range, to provide said concurring with the opposite polarities;
   otherwise if the ratio is outside the range, to concur the first duration with a first polarity or a second polarity of the AC power, for the first and second periods.

8. The lamp driver as claimed in claim 1, further comprising:
   a rectifier having a rectifier input for receiving the driver input and having a rectifier output for driving the lighting load,
   wherein the shunt device is either:
   connected between the rectifier and the lighting load, for selectively shunting the rectifier output; or
   integrated with the rectifier and for shunting the driver input.

9. The lamp driver as claimed in claim 7, comprising:
   a dimming interface for receiving a dimming level,
   and said controller is adapted to implement closed loop control according to said dimming level, and said ratio is dependent on the dimming level.

10. The lighting device comprising:
   a lamp driver as claimed in claim 1; and
   an LED lighting load, such as a tubular LED lamp, to be driven by said lamp driver.

11. A method of controlling a lighting load, comprising:
   receiving an supply of AC power with AC cycles with a first frequency, wherein each AC cycle comprises opposite first polarity and second polarity; and
   controlling a shunt device for selectively shunting the AC power from the supply and thereby prevent the AC power from reaching the lamp in a first duration, and not shunting the AC power and thereby allow it to pass to the lamp in a second duration following the first duration;
   concurring the first duration with the first polarity of each AC cycle of the AC power, for a first period comprising a first at least one AC cycle of the AC power;
   concurring the first duration with the second, opposite polarity of the AC power, for a second period comprising a second at least one AC cycle of the AC power not overlapping with the first at least one AC cycle of the AC power; and
   providing alternating first and second periods.

12. The method as claimed in claim 11, wherein said first duration and said second duration takes up one cycle of the AC power and wherein the method comprises providing alternating first and second periods thereby generating a second periodic signal with a second frequency lower than the first frequency and with a DC component less than a threshold.

13. The method as claimed in claim 12, wherein the first period comprises a plurality of successive AC cycles of the AC power, and the second period comprises another plurality of successive AC cycles of the AC power, and wherein the first period has substantially the same time length as the second period, and
   the DC component is zero.

14. The method as claimed in claim 11, comprising:
   determining if a ratio of the first duration to the second duration is in a range between a minimum threshold and a maximum threshold;
   if the ratio is in the range, to synchronize the first duration with a first polarity of the AC power, for the first and second periods; and
   otherwise if the ratio is outside the range, to synchronize the first duration with a first polarity of the AC power, for the first and second periods.

15. The method as claimed in claim 11, comprising receiving the supply of AC power from a fluorescent lamp electronic ballast, wherein the length of the first period and/or the second period is adapted to be shorter than a protection reaction period in the electronic ballast, wherein said protection reaction period relates to detection of DC signal in the output of the electronic ballast.

* * * * *